(12) United States Patent
Cavagna

(10) Patent No.: US 10,184,612 B2
(45) Date of Patent: Jan. 22, 2019

(54) PROPANE FILL ADAPTOR FOR VEHICLES

(71) Applicant: Cavagna Group SpA, Ponte San Marco (Brescia) (IT)

(72) Inventor: Davide Cavagna, Ponte San Marco (IT)

(73) Assignee: Cavagna Group SPA, Ponte San Marco (Brescia) (IT)

( * ) Notice: Subject to any disclaimer, the term of this patent is extended or adjusted under 35 U.S.C. 154(b) by 751 days.

(21) Appl. No.: 14/601,894

(22) Filed: Jan. 21, 2015

(65) Prior Publication Data

US 2015/0204467 A1 Jul. 23, 2015

Related U.S. Application Data

(60) Provisional application No. 61/929,611, filed on Jan. 21, 2014.

(51) Int. Cl.
*F16L 15/08* (2006.01)
*F17C 5/02* (2006.01)
*F16L 29/00* (2006.01)

(52) U.S. Cl.
CPC ............... *F17C 5/02* (2013.01); *F16L 29/00* (2013.01); *Y10T 29/49881* (2015.01)

(58) Field of Classification Search
CPC ....... F17C 5/02; F16L 29/00; Y10T 29/49881
See application file for complete search history.

(56) References Cited

U.S. PATENT DOCUMENTS

| 3,749,356 A | * | 7/1973 | Conley | F16L 29/00 222/3 |
| 7,314,209 B2 | * | 1/2008 | Pierson | F16L 37/40 251/149.6 |
| 2010/0327575 A1 | | 12/2010 | Blanchard et al. | |
| 2011/0005639 A1 | | 1/2011 | Weh et al. | |

FOREIGN PATENT DOCUMENTS

| EP | 0863037 | * | 9/1998 |
| EP | 2 330 330 B1 | | 10/2013 |

OTHER PUBLICATIONS http://www.afdc.energy.gov/vehicles/propane.html, Alternative Fuels Data Center: Propane Vehicles, 1 page, Dec. 24, 2013.

* cited by examiner

*Primary Examiner* — John C Hong
(74) *Attorney, Agent, or Firm* — Fay Sharpe LLP

(57) ABSTRACT

An adaptor for coupling an associated quick connect fitting on an associated tank to an associated filling gun includes a connector body selectively connectable to the associated filling gun. A hand wheel is mounted to the connector body. A washer is mounted to the connector body. A locking member is received within an aperture of the connector body and selectively received in a groove of the associated quick connect fitting. The locking member allows for engagement of the connector body with the associated filling gun when the locking member is received in the groove of the associated quick connect fitting. A biasing member is disposed between a portion of the connector body and a portion of the washer.

15 Claims, 8 Drawing Sheets

PROPANE FILL ADAPTOR FOR VEHICLES

CLAIM OF PRIORITY

The instant application claims the benefit of U.S. Provisional Application Ser. No. 61/929,611, filed Jan. 21, 2014, the subject matter of which is incorporated hereinto by reference in its entirety.

BACKGROUND

The present disclosure pertains to an adaptor for coupling a threaded liquefied gas fuel nozzle (e.g., an Acme threaded nozzle) to a quick-connect inlet of a vehicle fuel tank. However, it should be appreciated that the adaptor could also be employed on a quick-connect inlet of a stationary fuel tank or a fuel tank for a gas powered appliance or the like.

Propane, also known as liquefied petroleum gas (LPG) or auto gas, is considered an advantageous alternative fuel for light and medium duty vehicles. Many LPG powered vehicles are now employed in the United States in a variety of fleet applications, such as police cars, shuttles and school buses. Propane is advantageous from a number of standpoints. First, it has a high octane rating (104 to 112) compared to gasoline (87 to 92). Second, it has low carbon and oil contamination characteristics which have resulted in documented engine life up to two times that of gasoline engines. Third, cold start problems associated with liquid fuel are reduced with LPG because the fuel's mixture (propane and air) is completely gaseous. Moreover, LPG powered vehicles can produce lower amounts of harmful emissions, as compared with conventional diesel and gasoline powered vehicles.

A number of vehicles, such as forklift trucks, operate on propane or other LP gas which is stored in a fuel tank on the vehicle itself. These fuel tanks require refilling periodically and there are refilling systems known for such vehicles.

In the interest of fuel economy, it has now been considered desirable to equip automotive vehicles with LPG-type tanks which can be refilled from dispensers in specially adapted vehicle refilling stations equipped with large LPG tanks. Certain such refilling systems are already known in Europe. One known refilling system is a quick coupling system or quick connect employed in a number of European countries. However, in the United States, Acme thread filling guns are usually employed for filling the LPG tanks of vehicles. Therefore, a car or other vehicle having a quick connect LPG tank inlet cannot be refilled with a conventional LPG Acme threaded filling gun, such as is used in the United States.

It would be desirable to develop an adaptor so that a vehicle equipped with a quick connect coupling can be refilled at a service station which does not have a quick connect type refilling gun and is equipped only with an Acme-type refilling gun.

BRIEF SUMMARY

A filling adaptor for vehicles includes a connector body which is mounted to a quick connect coupling or inlet on the vehicle. Held between the coupling and the connector body is a sphere or ball which can selectively enter a groove in the quick connect coupling when a hand wheel of the connector is suitably positioned in relation to the connector body. This allows an Acme thread filling gun to be selectively threaded to the connector body thereby enabling LPG gas to be fed to the vehicle.

In one embodiment, the present disclosure relates to an adaptor for coupling an associated quick connect fitting on an associated tank to an associated filling gun. The adaptor includes a connector body selectively connectable to the associated filling gun. A hand wheel is mounted to the connector body. A washer is mounted to the connector body. A locking member is received within an aperture of the connector body and selectively received in a groove of the associated quick connect fitting. The locking member allows for engagement of the connector body with the associated filling gun when the locking member is received in the groove of the associated quick connect fitting. A biasing member is disposed between a portion of the connector body and a portion of the washer.

In another embodiment, the present disclosure relates to a method for coupling a quick connect fitting on a tank to a threaded filling gun. The method includes providing an adaptor that has a connector body, a hand wheel, a washer, a locking member, and a biasing member. The connector body is connected to the associated fitting on the associated tank. The washer is mounted to the connector body. The biasing member is positioned between a portion of the connector body and a portion of the washer. The locking member is disposed in an aperture located on the connector body and selectively within a groove of the associated fitting on the associated tank. The hand wheel is mounted to a portion of the connector body. The associated filling gun is threadedly mounted to the connector body.

In a further embodiment, the present disclosure relates to an adaptor for coupling an associated quick connect fitting on an associated tank to an associated filling gun. The adaptor includes a connector body selectively connectable to the associated filling gun. The connector body includes a first portion for receiving a portion of the associated quick connect fitting and a second portion for receiving a portion of the associated filling gun. A hand wheel is mounted to the connector body. Each of the hand wheel and the connector body include a hexagonal engagement portion. A washer is mounted to a portion of the connector body. A sphere is received within an aperture of the connector body and selectively received in a groove of the associated quick connect fitting. The sphere is free from engagement with the groove of the associated quick connect fitting when the adaptor is free from engagement with the associated filling gun. The sphere is partially located in the groove of the associated quick connect fitting when the adaptor is engaged with the associated filling gun. A spring is disposed between a portion of the connector body and a portion of the washer. The spring is configured to bias the hand wheel away from the washer.

BRIEF DESCRIPTION OF THE DRAWINGS

The drawings illustrate several embodiments of the present disclosure, in which.

DETAILED DESCRIPTION

Figure 1:
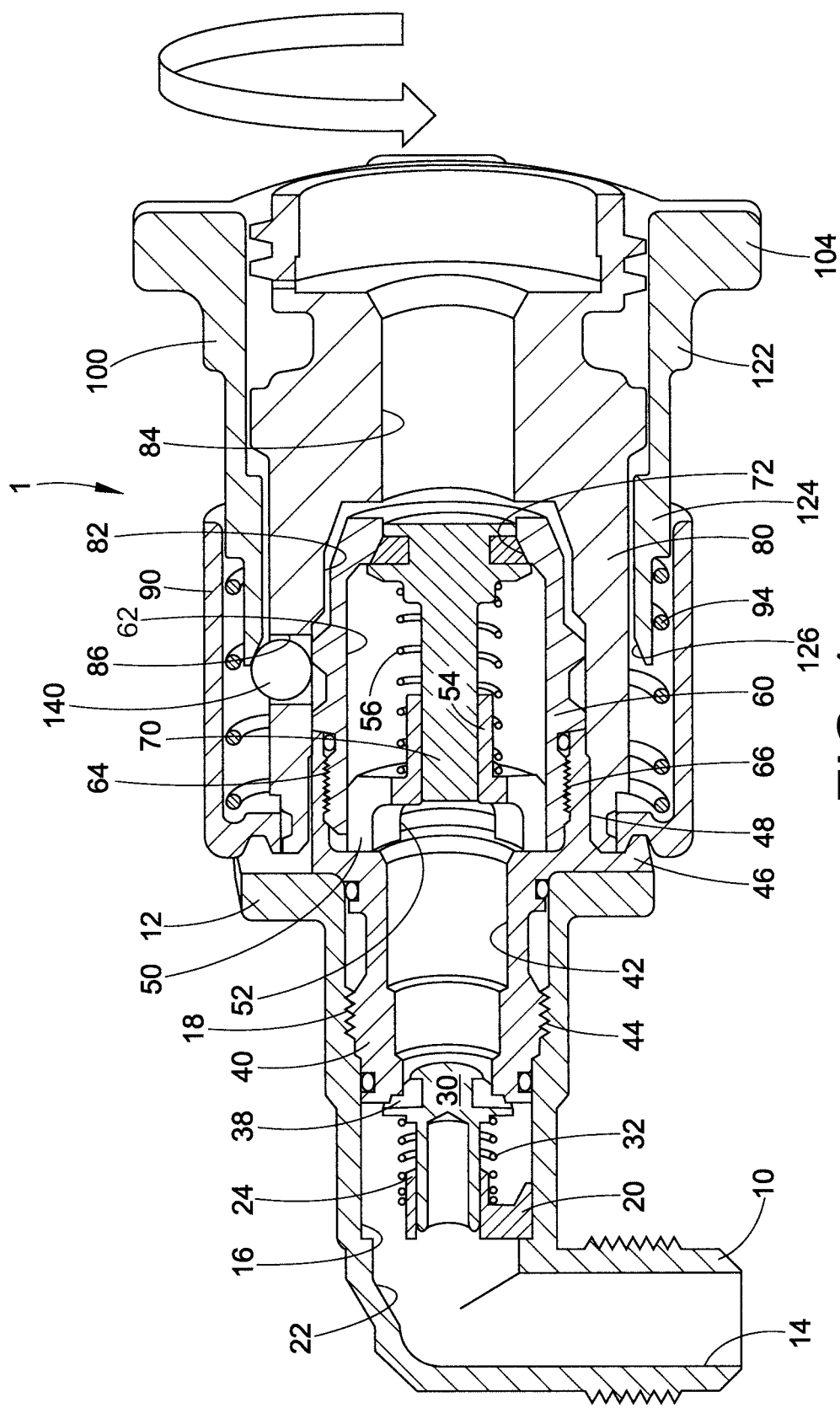
FIG. 1 is a cross sectional view of an adaptor according to one embodiment of the present disclosure.

Referring now to the drawings, wherein the showings illustrate a preferred embodiment of the present disclosure only and are not intended to limit same, FIG. 1 illustrates a known connector that comprises a flanged body 10 which communicates with an LPG fuel tank, such as a tank located on a vehicle. The flanged body includes an end section 12 and a channel or bore 14 which extends through the body. An enlarged bore section 16 is disposed in the flanged body 10. The body also has a threaded inner periphery portion 18 located in the enlarged bore section. Positioned in the flanged body 10 is a guide 20. The guide comprises a body with a slot section 22 and a reduced diameter cylindrical section 24. A piston or non-return valve 30 is mounted to the guide 20. A compression spring 32, held on the cylindrical section 24, biases the piston 30 to an end position such that the piston seals against a valve seat 38 of a connector 40.

The connector comprises a through bore 42 and includes a threaded outer peripheral portion 44 which cooperates with the threaded inner periphery portion 18 of the flanged body 10. The connector also includes an enlarged head section 46 which is seated on the end section 12 of the body 10. A threaded outer peripheral portion 48 is defined on the connector 40. Disposed in the connector 40 is a guide 50. The guide comprises a body that is provided with a slot 52 and a reduced diameter cylindrical section 54. Mounted on the reduced diameter section 54 is a compression spring 56. The guide 50 is accommodated in a coupling 60 which includes a bore 62. The coupling also includes a threaded outer peripheral portion 64 which mates with a threaded inner peripheral portion 66 of the connector 40. Held in the coupling 60 is a piston or non-return valve 70. The spring 56 biases the piston against a valve seat 72 defined on the coupling 60.

Thus, in this design, two non-return valves 30 and 70 are resiliently biased to closed positions. The bias of the respective compression spring 32 and 56 can, however, be overcome by the pressure exerted on the respective pistons by the LPG fuel during a filling operation. In this way, fuel can flow into the bore of the coupling 60 through the slot 52 of the guide 50, through the bore 42 in the connection 40, through the slot 22 of the guide 20, and out through a proximal end of the bore 14 in the flanged body 10.

According to the present disclosure, an adaptor 1 comprises a connector body 80, a washer 90, a biasing member 94, a hand wheel 100, and a locking member 140. Advantageously, the adaptor 1 allows for coupling of the tank on the vehicle to a propane filling gun, as described in more detail below.

The connector body 80 can be mounted on the coupling 60. To this end, the threaded portion 48 located on enlarged head 46 of the connector 40 engages with a threaded portion defined on an inner surface of a first portion of the connector body 80. The first portion of the connector body 80 thus receives a portion of the quick connect fitting (i.e., the coupling 60). A second portion of the connector body is adapted to receive a portion of a filling gun. The connector body 80 includes a first bore section 82 of a first diameter, in which the coupling 60 is accommodated, and a second bore section 84 of a reduced second diameter. The connector body 80 also includes a radially oriented aperture 86 and a threaded exterior end section 88 (see FIG. 4). The threaded exterior end section 88 allows the connector body 80 to be selectively connected to the associated filling gun. In one example, the threading 88 can be a conventional Acme threading. As is well known, an Acme thread is a screw thread profile with a trapezoidal outline. It is commonly used in a variety of applications. One such application is for securing an LPG fuel dispenser to the LPG tank of a known type of vehicle, such as a forklift truck or the like.

The washer 90 is mounted to the connector body 80. The washer 90 accommodates a biasing member 94 which is disposed between an outer periphery of the connector 80 and an inner periphery of the washer 90. As shown in FIG. 1, the washer 90 surrounds the entire biasing member 140. The biasing member 94 is configured to bias the hand wheel 100 away from the washer 90, as described in more detail below. In one embodiment, the biasing member 94 comprises a compression spring.

The hand wheel 100 is mounted to the connector body 80. The hand wheel 100 includes a distal end portion 122 and a stepped proximal portion 124. In some instances, the hand wheel 100 is slidably and rotatably mounted between a portion of the washer 90 and a portion of the connector body 80. For example, the stepped proximal portion 124 of the hand wheel 100 is disposed between an inner periphery of the washer 90 and an outer periphery of the connector body 80 such that the hand wheel 100 engages the biasing member 94, thereby exposing the distal end portion 122 of the hand wheel 100.

Figure 2A:
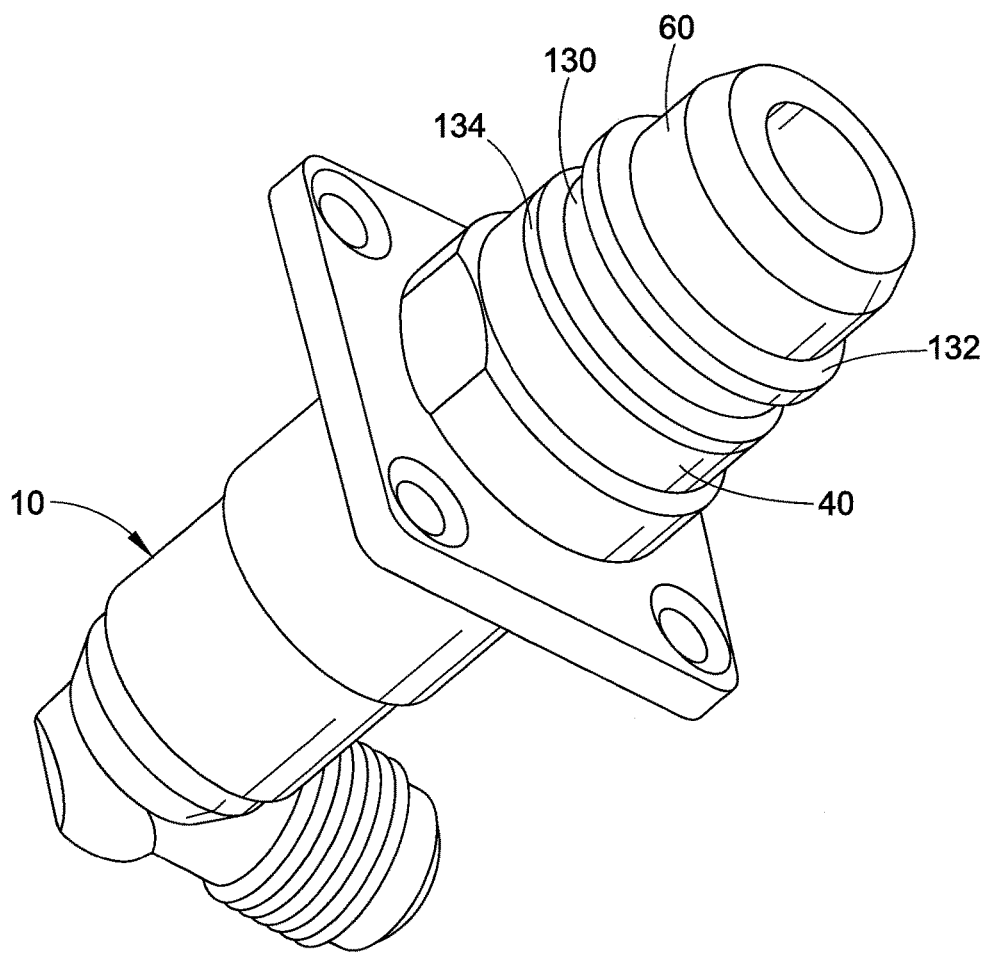
FIG. 2A is a perspective view of a known quick connect coupling employed on vehicles.
Figure 2B:
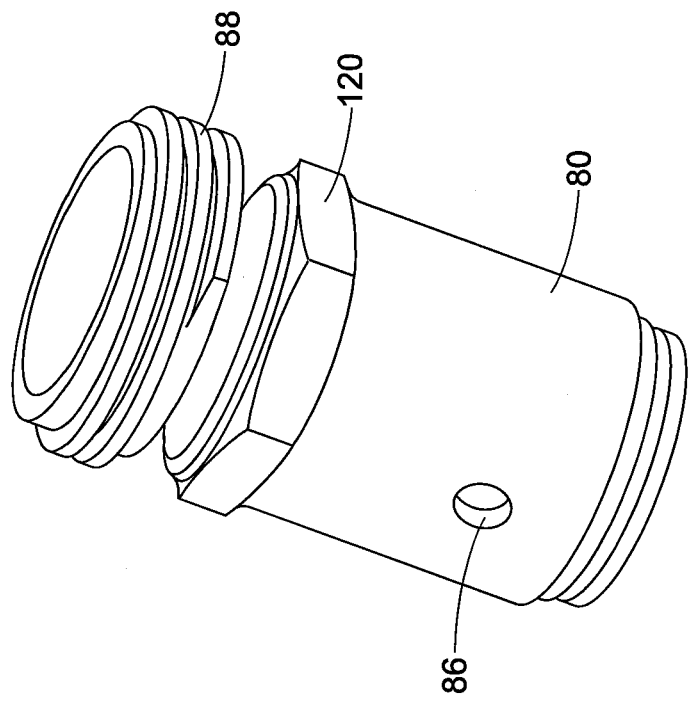
FIG. 2B is an exploded perspective view of a hand wheel and a connector body of the adaptor of FIG. 1.
Figure 2B:
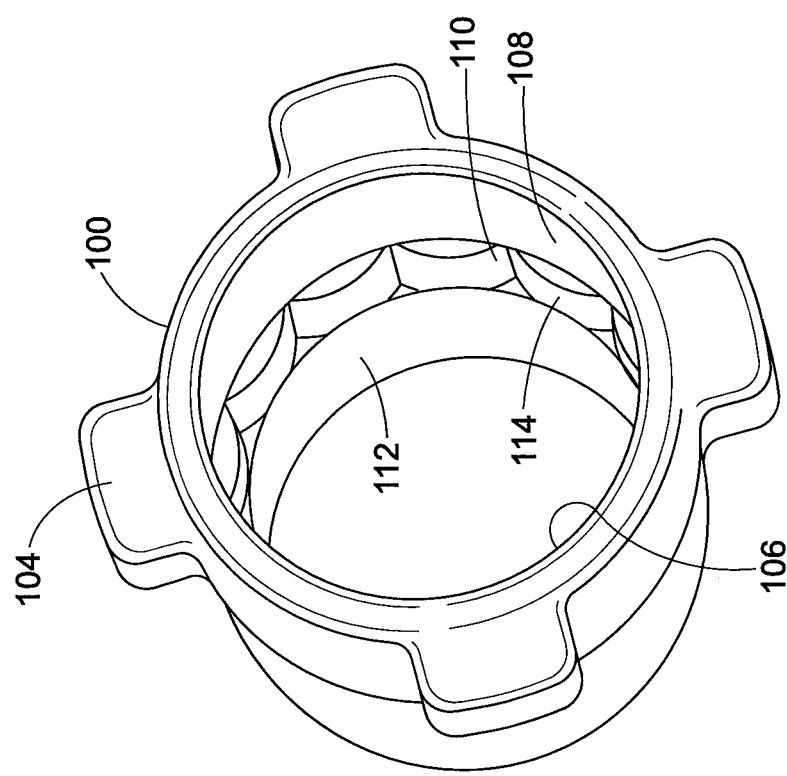

With reference now to FIG. 2B, the hand wheel includes a plurality of spaced flanges 104 defining between them gaps which accommodate the digits of a user when grasping the hand wheel 100 during rotation thereof. The flanges 104 are located on the distal end portion 122 of the hand wheel 100. The hand wheel 100 includes a bore 106 extending from the distal end portion 122 to a proximal end portion 126. The bore 106 comprises a first enlarged diameter section 108 at the end of which is defined a shoulder that forms a socket 110 and a second reduced diameter section 112. The socket 110 includes a plurality of angled wall sections 114. In one example, the wall sections 114 can have a hexagonal shape. Selectively accommodated in the socket 110 is a hexagonal flange 120 defined on the outer periphery of the connector body 80. As is apparent from FIG. 2B, the socket 110 can include sufficient wall sections 114 to allow the flange 120 to be mounted or held in the socket in several orientations relative to the connector body 80. Advantageously, the complementary shapes of the wall sections 114 and the flange 120 prevent disengagement of the hand wheel 100 and the connector body 80, respectively.

Figure 4:
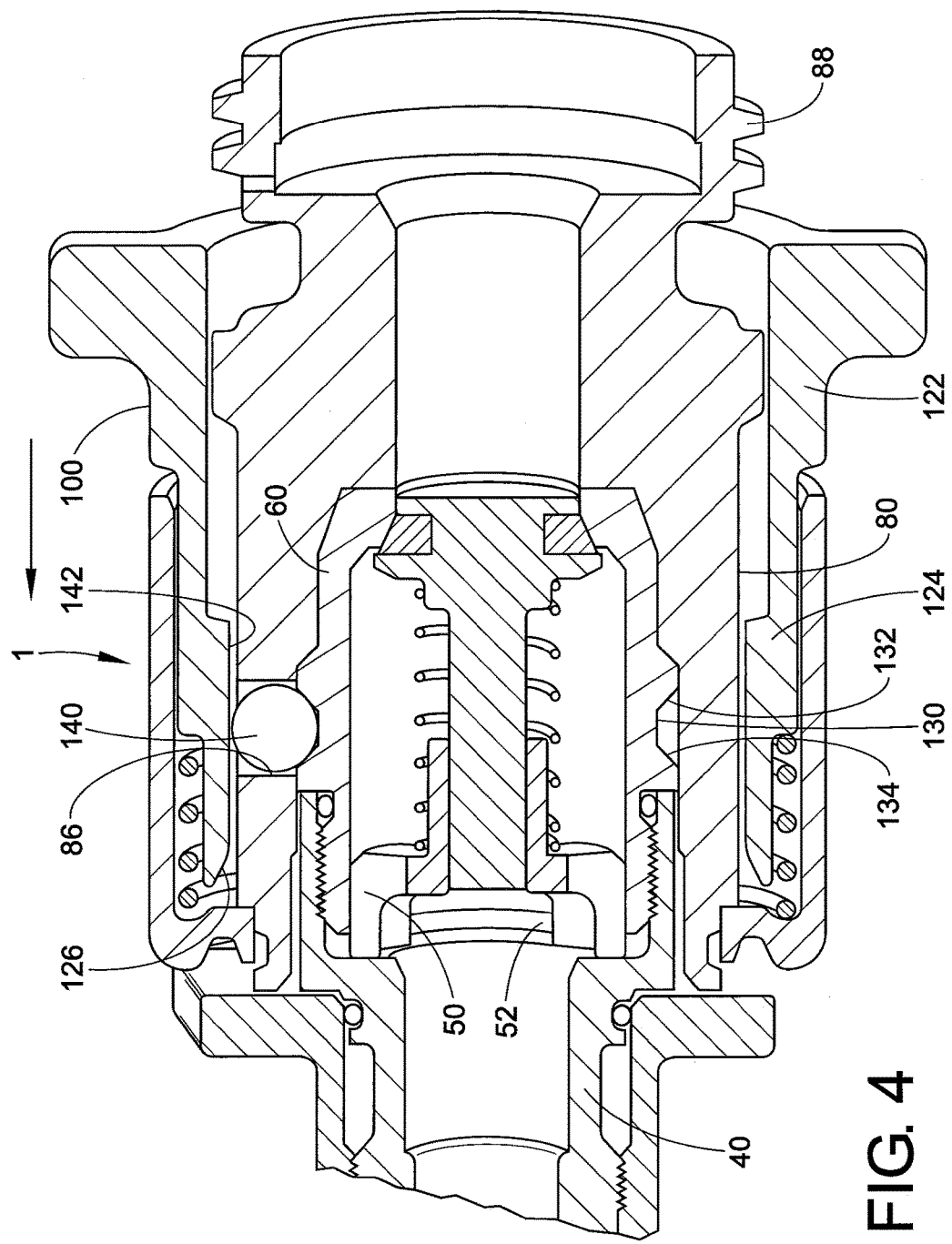
FIG. 4 is an enlarged cross-sectional view of a portion of the adaptor of FIG. 1, with the hand wheel thereof being shown in a second end position.

With reference now to FIGS. 2A and 4, defined on an outer periphery of the coupling 60 is a groove 130 that is located between first and second spaced flanges 132 and 134. These elements define a quick coupling architecture for the coupling 60. Selectively accommodated in the groove is a locking member 140 which is held in the aperture 86 defined in the connector body 80, according to the present disclosure. Advantageously, the locking member 140 allows engagement of the connector body 80 with the associated filling gun when the locking member 140 is held in the groove 130. In one example, the locking member 140 is a ball or sphere. The proximal end portion 126 of the hand wheel 100 urges the locking member 140 inwardly into the groove 130.

In the illustration in FIG. 4, the locking member 140 is selectively held in the groove 130 and is prevented from leaving the groove in the coupling 60 due to the location of the hand wheel 100. More particularly, an inner wall 142 of a hand wheel prevents the sphere from moving radially out of the groove 130. Stated another way, the inner wall 142 of the hand wheel 100 acts as a locking member engagement surface for the locking member 140.

FIG. 4 also shows the movement of the hand wheel 100 relative to the connector body 80. More particularly, the hand wheel 100 is adapted to reciprocate axially in relation to the connector body 80. In one example, the hand wheel 100 is rotatable as well as being axially movable relative to the connector body 80. The flanges 104 are grasped to rotate the hand wheel 100 as well as to move the stepped proximal portion 124 further into the area between the washer 90 and the connector body 80, thereby exposing the threaded exterior end section 88 of the connector body 80. The bias of the biasing member 140 is overcome to allow the hand wheel 100 to move towards the flanged body 10.

Prior to movement of the hand wheel 100, the locking member 140 is free from engagement with the locking member engagement surface 142 when the adaptor 1 is free from engagement with a filling gun. During movement of the hand wheel 100, the tapered end face 126 of the hand wheel engages the locking member 140, urges it radially inwardly, and locking member engagement surface 142 slides over the locking member. The locking member engagement surface 142 keeps the locking member 140 in the groove 130 of the coupling 60.

In the position of the hand wheel 100 shown in FIG. 4, threads of the threaded exterior end section 88 of the connector 80 are accessible to a filling gun. It should be appreciated, however, that the locking member (i.e., a sphere or ball) 140 can roll in the groove 130. Because the groove 130 extends circumferentially around the coupling 60, i.e. is toroidal, the connector body 80 can rotate on the coupling 60 as may be desired.

Figure 5:
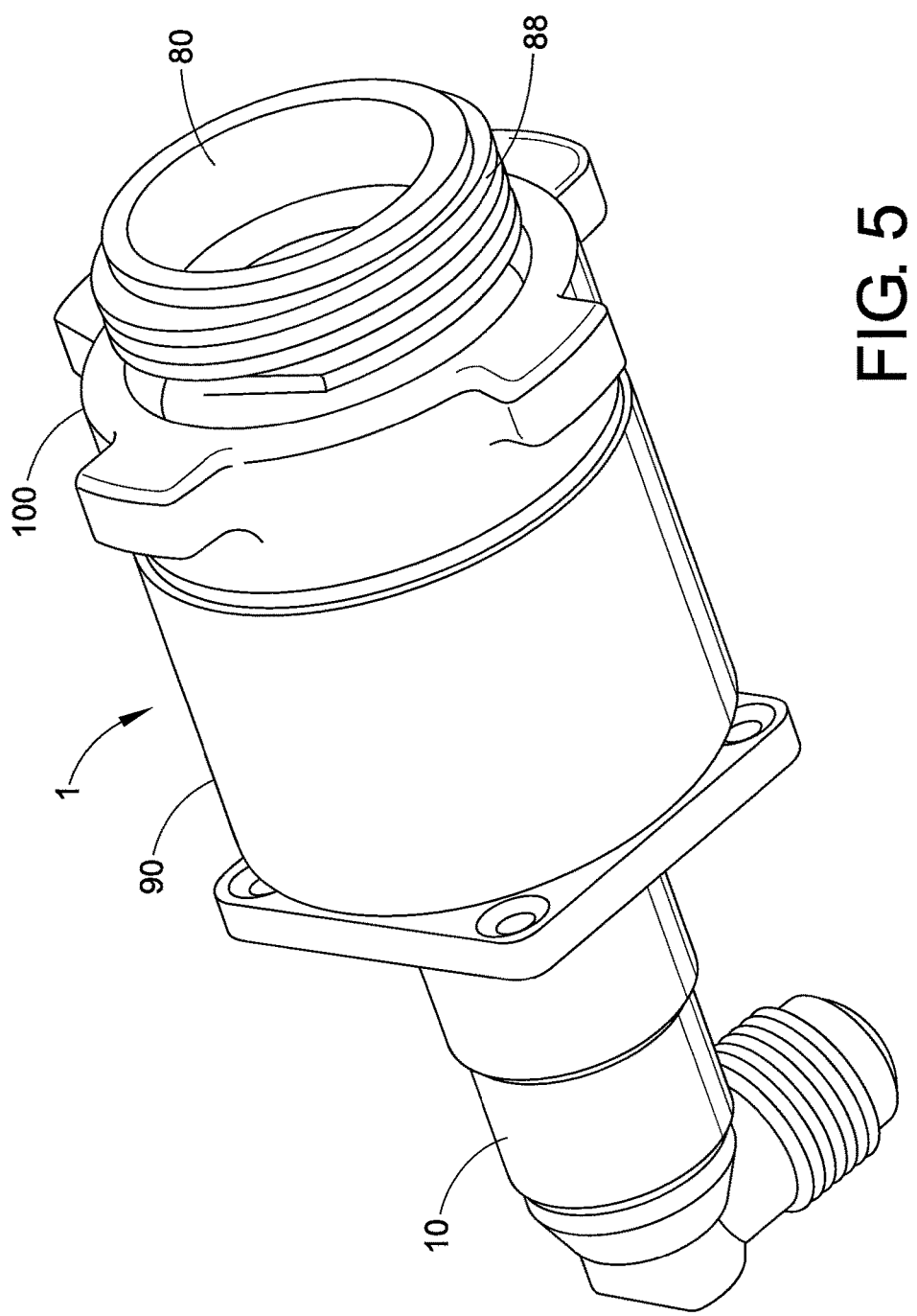
FIG. 5 is a perspective view of the adaptor of FIG. 1 illustrating the hand wheel in the second end position.
Figure 6:
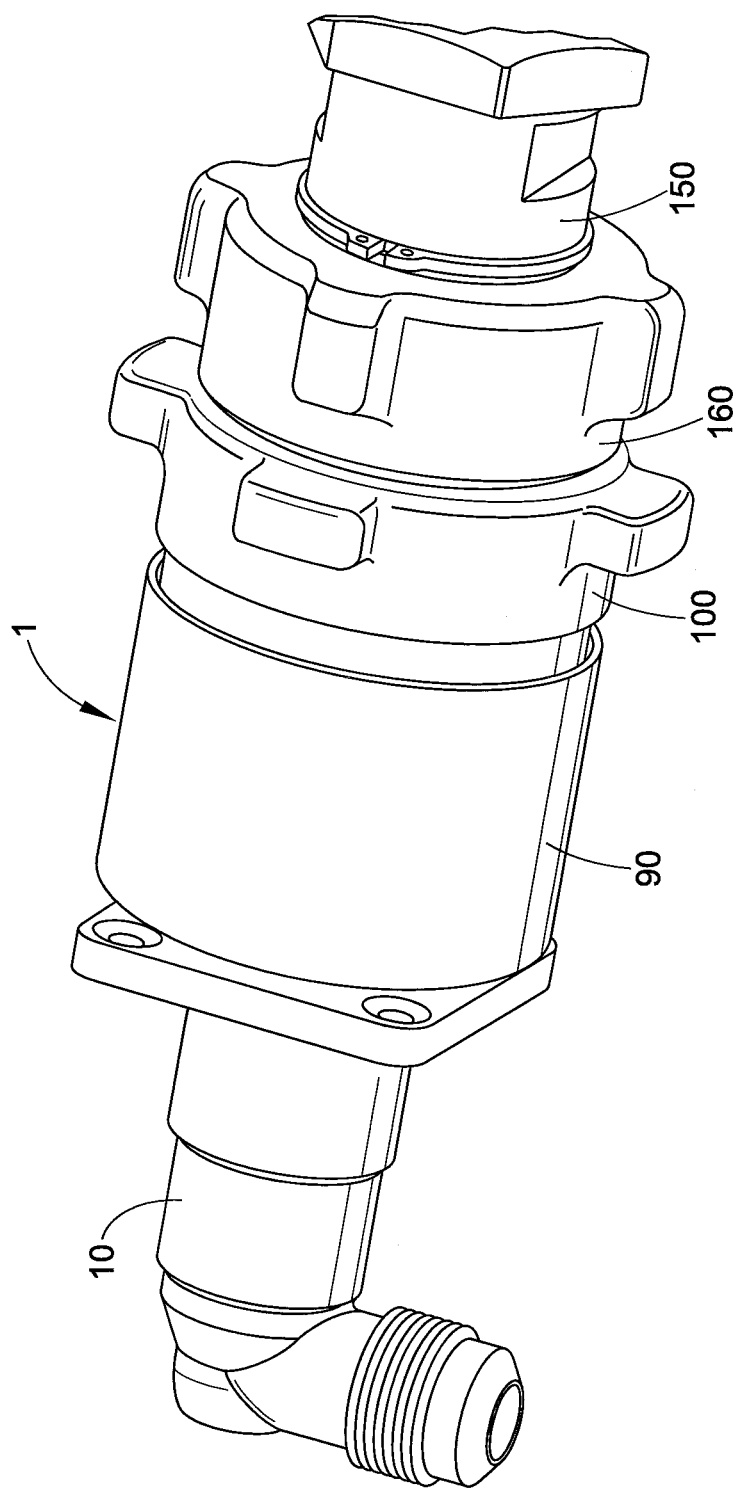
FIG. 6 is a perspective view showing a filling gun attached to the adaptor.

With reference now to FIG. 6, a filling gun 150 is shown as being mounted to the connector 80. During installation of the connector 80, the multi-angled socket 110 on the hand wheel 100 and the hexagonal flange 120 on the connector body 80 are engaged. Only when the connector 80 is completely mounted on the coupling 60, can the sphere 140 enter the groove 130. At this point, the hand wheel 100 of the adaptor, according to the present disclosure, can move axially overcoming the resistance of the biasing member 94 making it possible to engage the filling gun 150 with the adaptor 1. More particularly, a hand wheel 160 of the filling gun 150 includes an internal Acme thread which threadedly connects to the threaded exterior end section 88 of the connector body 80. At this time, the hand wheel 100 is in the position illustrated in FIG. 5, thereby keeping the locking member 140 in the groove 130.

Figure 3:
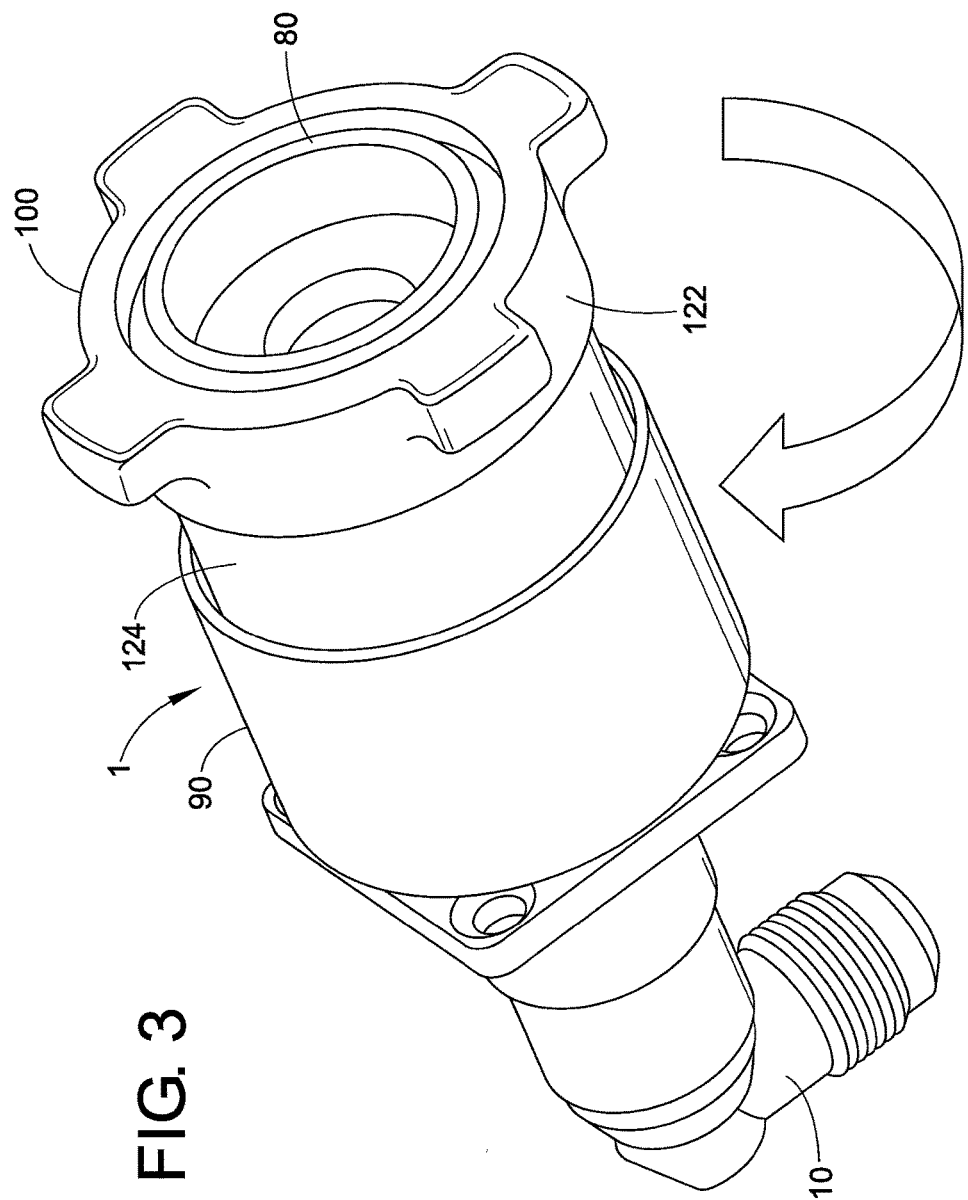
FIG. 3 is a perspective view of the adaptor of FIG. 1 with a hand wheel thereof being shown in a first end position.

It should be appreciated that the compression spring 94 resiliently biases the hand wheel 100 away from the flange body 10, as shown in FIG. 3. This allows the sphere 140 to protrude out of the aperture 86 when there is no filling gun 150 mounted to the connector 80. Prior to movement of the hand wheel 100, the locking member 140 is free from engagement with the locking member engagement surface 142 when the adaptor 1 is free from engagement with the filling gun 150 (as shown in FIG. 1). During engagement of the adaptor 1 with the filling gun 150, the locking member 140 engages the locking member engagement surface 142. Consequently, the locking member 140 protrudes from the aperture 86 when the adaptor 1 is free from engagement with the filling gun 150, thereby preventing axial movement of the connector body 80 relative to the quick connect fitting (i.e., the coupling 60). The locking member 140 is received within the aperture 86 when the adaptor 1 is engaged with the filling gun 150, thereby permitting engagement of the connector body 80 with the coupling 60.

Figure 7:
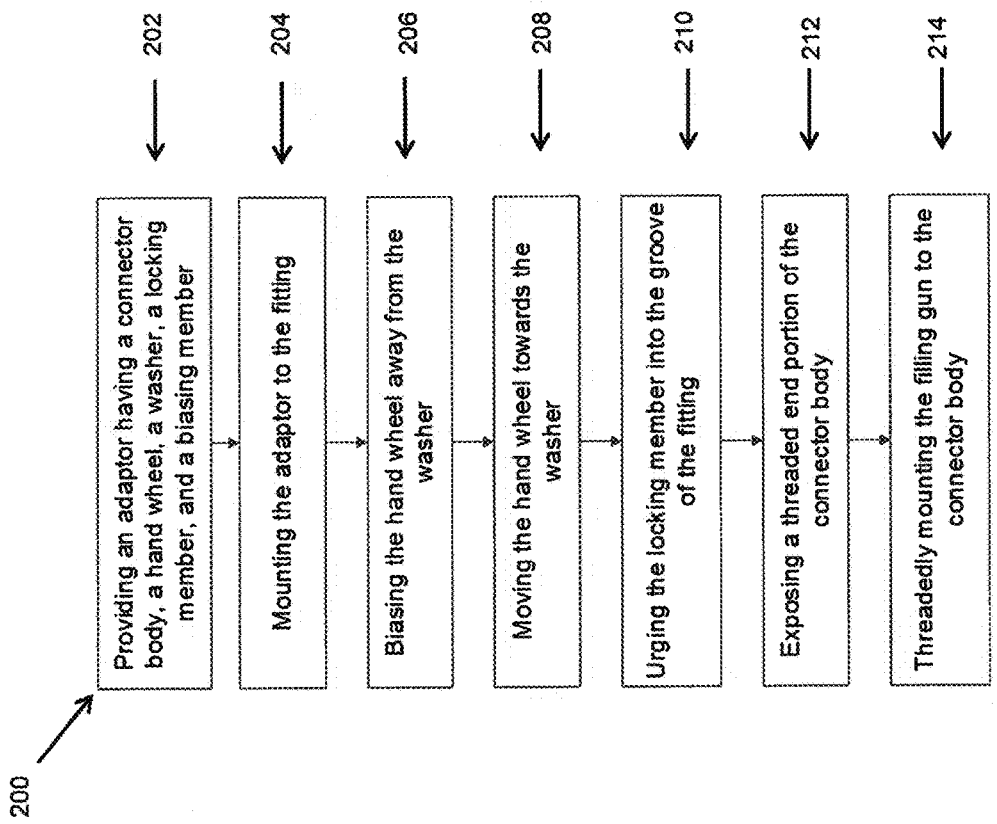
FIG. 7 is a flow chart showing a use of the adaptor.

FIG. 7 illustrates an exemplary method 200 for coupling a quick connect fitting on a tank to a threaded filling gun. The method 200 includes the steps of: providing an adaptor having a connector body, a hand wheel, a washer, a locking member, and a biasing member (Step 202); mounting the adaptor to the fitting on the associated tank (Step 204); biasing the hand wheel away from the washer (Step 206); moving the hand wheel toward the washer (Step 208); urging the locking member into a groove of the associated fitting on the associated tank (Step 210); exposing a threaded end portion of the connector body (Step 212); and threadedly mounting the associated filling gun to the connector body (Step 214).

At Step 202, an adaptor having a connector body, a hand wheel, a washer, a locking member, and a biasing member is provided. In one example, the adaptor 1 described above can be provided for use with the method 200. Consequently, the connector body 80, the washer 90, the biasing member 94, the hand wheel 100, and the locking member 140 described above can be provided with the adaptor 1.

At Step 204, the adaptor is connected to an associated fitting on an associated tank. In one example, the connector body 80 is threadably mounted to the coupling 60. In another example, the connector body 80 is slid onto the coupling 60.

At Step 206, the hand wheel 100 is biased away from the washer 90. In one example, a biasing member 94 is employed for this purpose.

At Step 208, the hand wheel 100 is moved towards the washer 90. In one example, the hand wheel is manually urged towards the washer 90 against the bias of the biasing member 94.

At Step 210, the locking member 140 is urged into the groove 130 of the fitting on the tank (i.e., the coupling 60). In one example, the locking member 140 protrudes from the aperture 86 when the adaptor 1 is free from engagement with the filling gun 150, thereby allowing axial movement of the connector body 80 relative to the coupling 60. The locking member 140 is received within the groove 130 when the adaptor 1 is engaged with the associated filling gun 150, thereby preventing movement of the connector body 80 in relation to the coupling 60.

At Step 212, the threaded portion 88 of the connector body 80 is exposed. In some instances, the hand wheel 100 is rotatably and axially movable in relation to the connector body 80. From a comparison of FIGS. 1 and 4, it is evident that there is movement of the connector body 80 axially in relation to the coupling 60 when the connector body 80 of the adaptor is in the process of being threadedly engaged with or disengaged from the coupling 60. FIGS. 1 and 4 also show that the locking member 140, which can be a ball bearing or the like, moves both radially and axially as the connector body 80 is engaged with the coupling 60 and as the hand wheel 100 of the adaptor reciprocates.

At Step 214, the filling gun 150 is threadedly mounting to the connector body 80. For example, the filling gun 150 includes threads that are engaged with the threaded portion 88 of the connector body 80.

Although Steps 202-214 of the method 200 are described as sequential steps it will be appreciated that Steps 202-214 of the method 200 may be performed simultaneously or in any order. For example, Step 210 may be performed before Step 204, 206, and/or 208.

The adaptor 1 provides a safe system which avoids a premature or accidental unthreading of the connector from the quick connect coupling. Until the filling gun 150 is disconnected, the connector body 80 cannot be accidentally unthreaded because the relative hexagonal shapes 120 and 110 on the hand wheel 100 and the connector body 80, respectively, are disengaged. Thus, even if there is friction between the Acme filling gun 150 and the connector body 80, the connector body 80 cannot be inadvertently moved (unthreaded) because the locking member 140 is held in the groove 130.

Only after the Acme filling gun 150 is disconnected from the connector body 80 can the connector body 80 be unthreaded from or disengaged from the connector 40.

An adaptor for converting a quick connect coupling for refilling vehicular LPG tanks, such as is commonly used in Europe, to a common Acme filling gun, such as is commonly used in the United States, is disclosed. The adaptor provides a system which avoids a premature or accidental unthreading of the adaptor from the filling port prior to safe removal of the filling gun from the adaptor.

The disclosure has been described with reference to an embodiment. Obviously, modifications and alterations will occur to others upon the reading and understanding of this specification. It is intended to include all such modifications and alterations in so far as they come within the scope of the appended claims or the equivalents thereof.

The invention claimed is:

1. An adaptor for coupling an associated quick connect fitting on an associated tank to an associated filling gun, the adaptor comprising:
   a connector body selectively connectable to the associated filling gun;
   a hand wheel mounted to the connector body;
   a washer mounted to the connector body;
   a locking member received within an aperture of the connector body and selectively received in a groove of the associated quick connect fitting, the locking member allowing for engagement of the connector body with the associated filling gun when the locking member is received in the groove of the associated quick connect fitting, wherein the locking member protrudes from the aperture when the adaptor is free from engagement with the associated filling gun, thereby retarding an axial movement of the connector body in one direction relative to the associated quick connect; and
   a biasing member disposed between a portion of the connector body and a portion of the washer.

2. The adaptor of claim 1, wherein the connector body includes:
   a first portion for receiving a portion of the associated quick connect fitting; and
   a second portion for receiving a portion of the associated filling gun.

3. The adaptor of claim 1, wherein the connector body includes a threaded portion for selective engagement with the associated filling gun.

4. The adaptor of claim 1, wherein a portion of the hand wheel is disposed between a portion of the connector body and a portion of the washer.

5. The adaptor of claim 1, wherein a portion of the hand wheel is adapted to axially reciprocate in relation to the connector body.

6. The adaptor of claim 5, wherein the hand wheel is adapted to rotate in relation to the connector body.

7. The adaptor of claim 1, wherein the hand wheel and the connector body each include a respective hexagonal engagement surface.

8. The adaptor of claim 1 wherein the hand wheel comprises a tapered surface which engages the locking member, wherein when the hand wheel is moved axially against a resistance of the biasing member, the tapered surface urges the locking member radially inwardly.

9. An adaptor for coupling an associated quick connect fitting on an associated tank to an associated filling gun, the adaptor comprising:
   a connector body selectively connectable to the associated filling gun;
   a hand wheel mounted to the connector body;
   a washer mounted to the connector body;
   a locking member received within an aperture of the connector body and selectively received in a groove of the associated quick connect fitting, the locking member allowing for engagement of the connector body with the associated filling gun when the locking member is received in the groove of the associated quick connect fitting; and
   a biasing member disposed between a portion of the connector body and a portion of the washer,
   wherein the hand wheel includes a locking member engagement surface, the locking member being free from engagement with the locking member engagement surface when the adaptor is free from engagement with the associated filling gun, the locking member engaging the locking member engagement surface when the adaptor is engaged with the associated filling gun, wherein the hand wheel and the connector body each include a respective hexagonal engagement surface.

10. The adaptor of claim 1, wherein the hand wheel includes a plurality of flanges to accommodate rotation thereof.

11. The adaptor of claim 1, wherein the hand wheel comprises a tapered proximal end.

12. The adaptor of claim 1, wherein the biasing member is configured to bias the hand wheel away from the washer.

13. The adaptor of claim 1, wherein the locking member comprises a sphere.

14. The adaptor of claim 1, wherein the biasing member comprises a spring.

15. An adaptor for coupling an associated quick connect fitting on an associated tank to an associated filling gun, the adaptor comprising:
   a connector body selectively connectable to the associated filling gun, the connector body including a first portion for receiving a portion of the associated quick connect fitting, and a second portion for receiving a portion of the associated filling gun;
   a hand wheel mounted to the connector body, wherein each of the hand wheel and the connector body include a hexagonal engagement portion;
   a washer mounted to a portion of the connector body;
   a sphere received within an aperture of the connector body and selectively received in a groove of the associated quick connect fitting, the sphere being free from engagement with the groove of the associated quick connect fitting when the adaptor is free from engagement with the associated filling gun, the sphere being partially located in the groove of the associated quick connect fitting when the adaptor is engaged with the associated filling gun; and a spring disposed between a portion of the connector body and a portion of the washer, the spring being configured to bias the hand wheel away from the washer.

\* \* \* \* \*